(12) United States Patent
Konopa

(10) Patent No.: US 7,886,853 B2
(45) Date of Patent: Feb. 15, 2011

(54) MOTORIZED HAND CART FOR LIFTING AND MOVING LARGE HEAVY OBJECTS

(76) Inventor: Kristopher R Konopa, 2285 Center St., East Aurora, NY (US) 14052

( * ) Notice: Subject to any disclaimer, the term of this patent is extended or adjusted under 35 U.S.C. 154(b) by 280 days.

(21) Appl. No.: 12/141,434

(22) Filed: Jun. 18, 2008

(65) Prior Publication Data

US 2008/0315541 A1 Dec. 25, 2008

Related U.S. Application Data

(60) Provisional application No. 60/944,908, filed on Jun. 19, 2007.

(51) Int. Cl.
*B62D 51/04* (2006.01)
(52) U.S. Cl. ............... 180/19.1; 180/9.22; 280/47.131; 280/47.19
(58) Field of Classification Search ........... 280/47.131, 280/47.19, 47.35, 47.29, 47.27, 47.331, 43.23, 280/652, 655; 180/65.6, 19.1, 9.22, 9.3; 211/20, 22
See application file for complete search history.

(56) References Cited

U.S. PATENT DOCUMENTS

| | | | | |
|---|---|---|---|---|
| 3,667,728 A | * | 6/1972 | Garelick | ............... 254/8 R |
| 3,865,392 A | * | 2/1975 | Hartway | ................. 280/35 |
| 4,747,457 A | * | 5/1988 | Buscaiolo et al. | ............ 180/19.1 |
| 4,896,897 A | * | 1/1990 | Wilhelm | ............... 280/655 |
| 5,513,939 A | * | 5/1996 | Martin et al. | ............ 280/47.24 |
| 5,716,061 A | * | 2/1998 | Sloan et al. | ............ 280/43.23 |
| 6,062,328 A | * | 5/2000 | Campbell et al. | ........... 180/65.6 |
| 6,244,603 B1 | * | 6/2001 | Rizzardi | ............ 280/47.331 |
| 6,408,962 B1 | | 6/2002 | Ryckman | |
| 6,488,157 B2 | * | 12/2002 | Chen | ................. 211/20 |
| 6,530,740 B2 | * | 3/2003 | Kim | ............ 280/47.21 |
| 6,793,236 B1 | * | 9/2004 | Mitchell | ............... 280/652 |
| 6,983,812 B2 | | 1/2006 | Tucker | |
| 7,036,832 B2 | | 5/2006 | Gargaro | |
| 7,163,213 B2 | | 1/2007 | Chambers | |

* cited by examiner

*Primary Examiner*—Hau V Phan
(74) *Attorney, Agent, or Firm*—Patricia M. Costanzo, Esq.

(57) ABSTRACT

A dual-motor handcart for lifting, steering, and transporting a heavy object, such as a snowmobile, by one person, having two motor-powered wheels or trackdrives for moving and steering attached to a width and height adjustable frame, the frame offering a handle, a pair of legs connected to the handle, lift pads for supporting the heavy object, a length adjustable lift strap for coupling the frame to the heavy object. The operatively independent motors each attached to one of the wheels providing force required for moving and steering. Thumb switches having on, off, forward, and reverse motions settings at desired speeds, control each motor providing for a single person to easily steer a cart fully loaded with a heavy object over smooth or rough terrain.

20 Claims, 7 Drawing Sheets

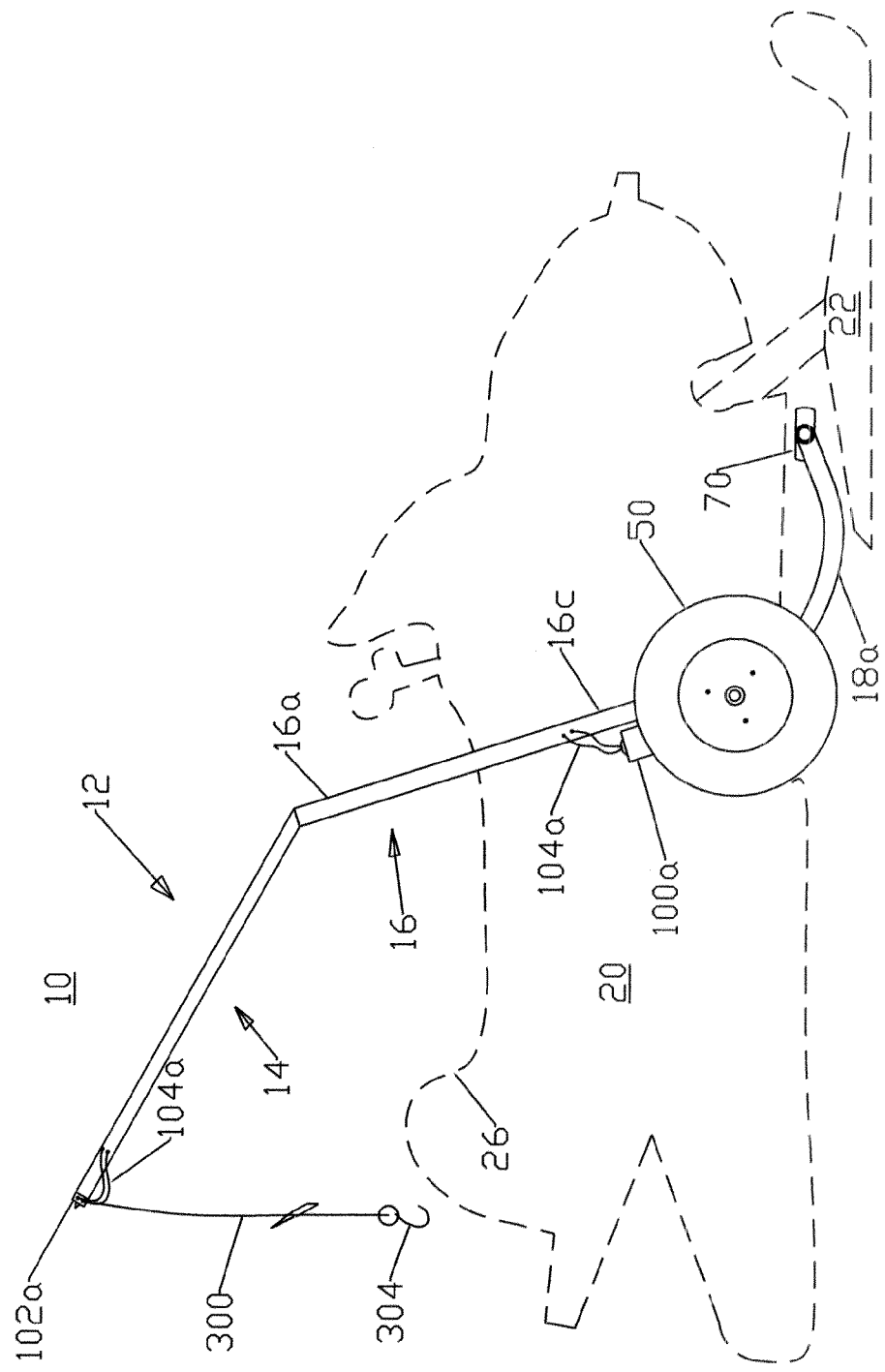

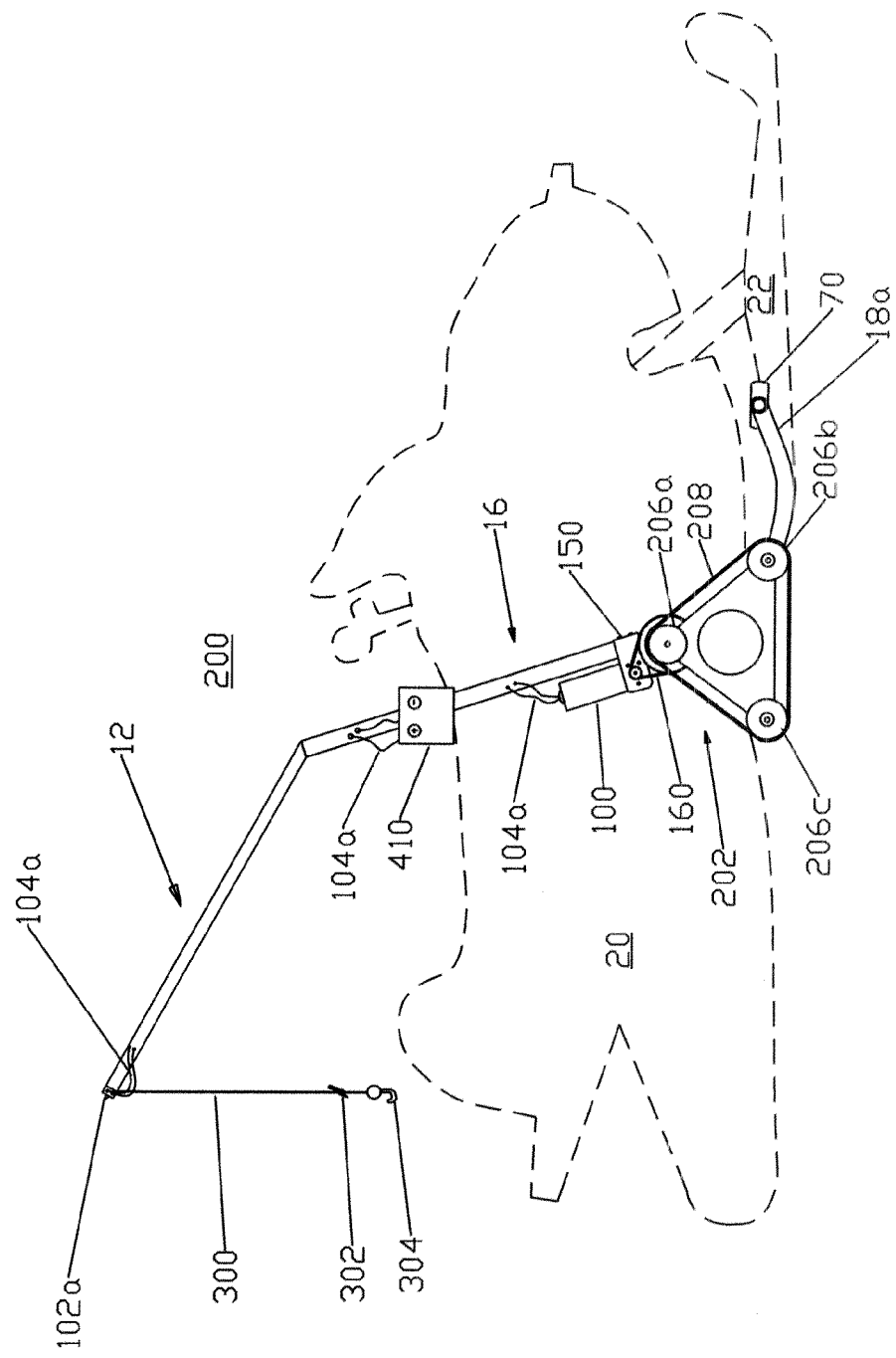

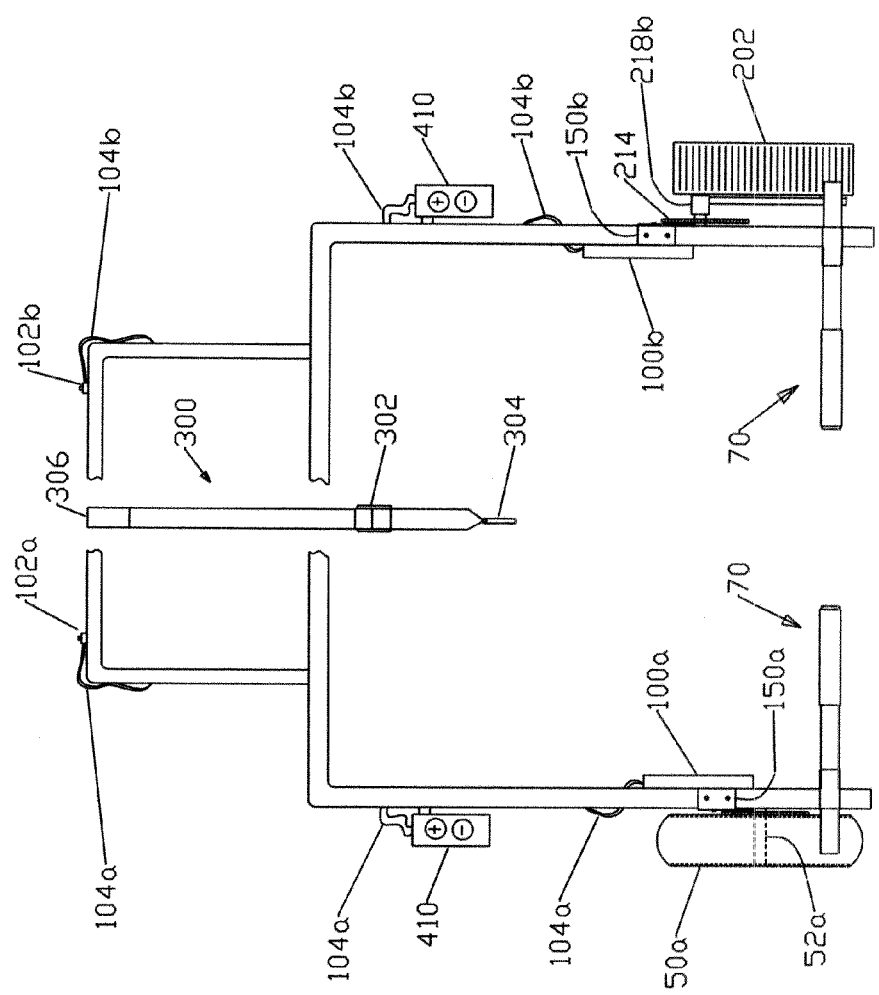

MOTORIZED HAND CART FOR LIFTING AND MOVING LARGE HEAVY OBJECTS

CROSS-REFERENCE TO RELATED APPLICATIONS

This Application claims the benefit of Provisional Application No. 60/944,908 filed on Jun. 19, 2007

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to hand-type carts for moving objects, and more particularly, relates to an all-terrain, foldable, motorized, steerable, wheeled or track-driven cart for lifting and moving heavy objects, such as a snowmobile.

The background information discussed below is presented to better illustrate the novelty and usefulness of the present invention. This background information is not admitted prior art.

Track-drives of snowmobiles require an appreciable amount of traction to move heavy snowmobile over terrain covered by snow and ice. Thus, snowmobile rubber tracks usually are fitted with heavy duty studs made of a hard material, such as titanium or other materials of similar hardness to attain the friction required. Titanium hardness can equal or exceed that of stainless steel. While the studs effectively supply the required traction, when the snowmobile is moved over other surfaces the studs are the floor on which they sit can be compromised. For example, snowmobiles are frequently stored in garages having concrete or cement floors and if a snowmobile having studded drive tracks were to be moved with the studs in direct contact with the floor, the floor is likely to suffer considerable damage. In order to move the snowmobile and to protect the floor, the snowmobile should be lifted off of the floor while it is being moved. Typical snowmobiles, however, weigh between about 400 and 600 pounds. Their weight combined with their elongate shape makes lifting a snowmobile impossible for even a strong single person and exceedingly difficult for two. It would be desirable, therefore, to have a means to move snowmobiles that would provide for moving the snowmobile without the snowmobile studs damaging the surface upon which they rest. It would be even more desirable if the means would allow safe movement of the snow mobile by one person.

There have been some attempts to provide for snowmobile lift carts, but the results of these attempts are limited. In each case, once the cart lifts the snowmobile off of the floor, it is exceedingly difficult, if not effectively impossible, to maneuver the snowmobile because presently available carts offer no steering aid mechanism and the drive power is manual. Additionally, the presently available carts cannot provide for moving lifted objects over terrain that is not a smooth surface, such as a garage floor or a smoothly surfaced driveway.

SUMMARY

The present invention offers a specialized lift-cart device, designed for lifting large, heavy, and awkwardly shaped objects, such as snowmobiles. The cart lifts the snowmobile off of the floor, provides for easy maneuverability, provides for the leverage required for easy lifting, offers motor assisted movement of the object it has lifted, motorized steering aids, and optional drive systems, such as a track-drive system that provides for transporting the vehicle over rough terrain.

The lift-cart device, as taught herein, protect the floor over which, the heavy object, such as a snowmobile is to be moved. The snowmobile is easily lifted off of the floor even though typical snowmobiles weigh between about 400 and 600 pounds and possess an awkward (with regard to lifting) shape by a single person, before it is moved due to the leverage provided by the lever action of the cart. The first-class lever action of the cart is provided by the lifts and handle of the cart, and a strap attached to the handle to connect the snowmobile body to the pivoting handle. The lift-cart of the present invention is equipped with a motor attached to each wheel-drive of the cart providing for motor-assisted steering aid. Additionally, the cart may be fitted with either wheels or a belt drive train providing for moving lifted objects over rough terrain, in addition to over a smooth ground surface, such as a garage floor or a smoothly surfaced driveway.

These advantages are offered by providing for a hand cart, comprising:

a dual-motor cart for lifting, steering, and transporting a heavy object by a single person, the cart comprising:

two rotatable devices for moving and steering the cart, each of the two rotatable devices functionally positioned about an axle, a frame coupled to each of the two rotatable devices, the frame comprising:

a handle, a pair of legs each comprising a proximal end and a distal end, the proximal ends each engaging the handle, the distal end having a first distal part extending from the handle to one of the axles, and a second distal part extending beyond the axle, a pair of lift pads, each supported by and affixed to an area of the first distal part of each of the legs near the second distal part of each of the legs, the pads for supporting the heavy object to be lifted and transported, an opening disposed between the legs and the lift pads of each of the legs such that the heavy object may be received between the legs and engaged by the lift pads, a lift strap suspending from the handle, the strap for coupling with a frame of the object to be lifted, the handle and the legs cooperatively serving as a lever and the axles acting as fulcrums providing for lifting the heavy object when engaged by the lift pads and coupled with the strap providing for the heavy object to be lifted and moved by one person, and at least two operatively independent motors, each supported on the frame and each functionally attached to one of the two rotatable devices, each of the motors providing to one of the rotatable devices the force required for moving and steering the cart.

Additional advantages include the adjustability of the frame and its parts, such as the frame being height adjustable providing for the distance of the handle from the floor to be increased or decreased to provide the amount of leverage required by persons of different heights to lift a heavy object, where each of the legs comprises two pieces, wherein the two pieces are slidably engagable to each other providing for each of the legs to be length adjustable, where the strap is length adjustable providing for the strap to be shortened or lengthened to suit the height of the user, and where the frame is width adjustable providing for the cart to lift and transport a relatively narrow or relatively broad heavy object.

These advantages are especially appreciated when the heavy object is a snowmobile.

To enable easy move-ability and steering a thumb switch is connected to each of the motors, the thumb switch having settings for on, off, forward, and reverse motions each at a desired speed providing for a single person to easily steer the cart even when it is fully loaded with a heavy object.

One preferred embodiment is a hand cart that comprises a dual-motor wheel driven cart for lifting, steering, and transporting a heavy object by a single person, whereas another preferred embodiment is a hand cart, comprising a dual-motor track-driven cart for lifting, steering, and transporting a heavy object by a single person.

BRIEF DESCRIPTION OF THE DRAWINGS

In order that these and other objects, features, and advantages of the present invention may be more fully comprehended and appreciated, the invention will now be described with reference to specific exemplar embodiments, which are illustrated in appended drawings, wherein like reference characters indicate like parts throughout the several figures. It should be understood that these drawings only depict embodiments of the present invention selected for illustration and are therefore not to be considered limiting in scope. For the purposes of explanation, the present motorized cart invention is herein illustrated and described as a motorized wheel-driven and as a motorized track-driven cart.

Accordingly, the present invention will now be described and explained with additional specificity and detail through the use of the accompanying drawings, in which:

FIG. 2 illustrates a side elevation view of the motorized wheel-driven cart, as shown in FIG. 1, supporting a snowmobile illustrated in dashed lines, to illustrate how the cart supports a snowmobile that is to be transported by the cart.

FIG. 3b illustrates a partially transparent side elevation view of the motor and wheel, as illustrated in FIG. 3a.

FIG. 4 illustrates a side elevation view of a motorized track-driven cart and its relationship to a snowmobile that is to be transported by the cart.

FIG. 5 illustrates a front elevation view of one side section of a motorized wheel-driven cart frame and a complementary, analogous section of a motorized track-driven cart frame to illustrate the structural similarities and differences between a motorized wheel-driven cart and a motorized track-driven cart.

REFERENCE NUMERALS AND PARTS OF THE INVENTION TO WHICH THEY REFER

Figure 1:
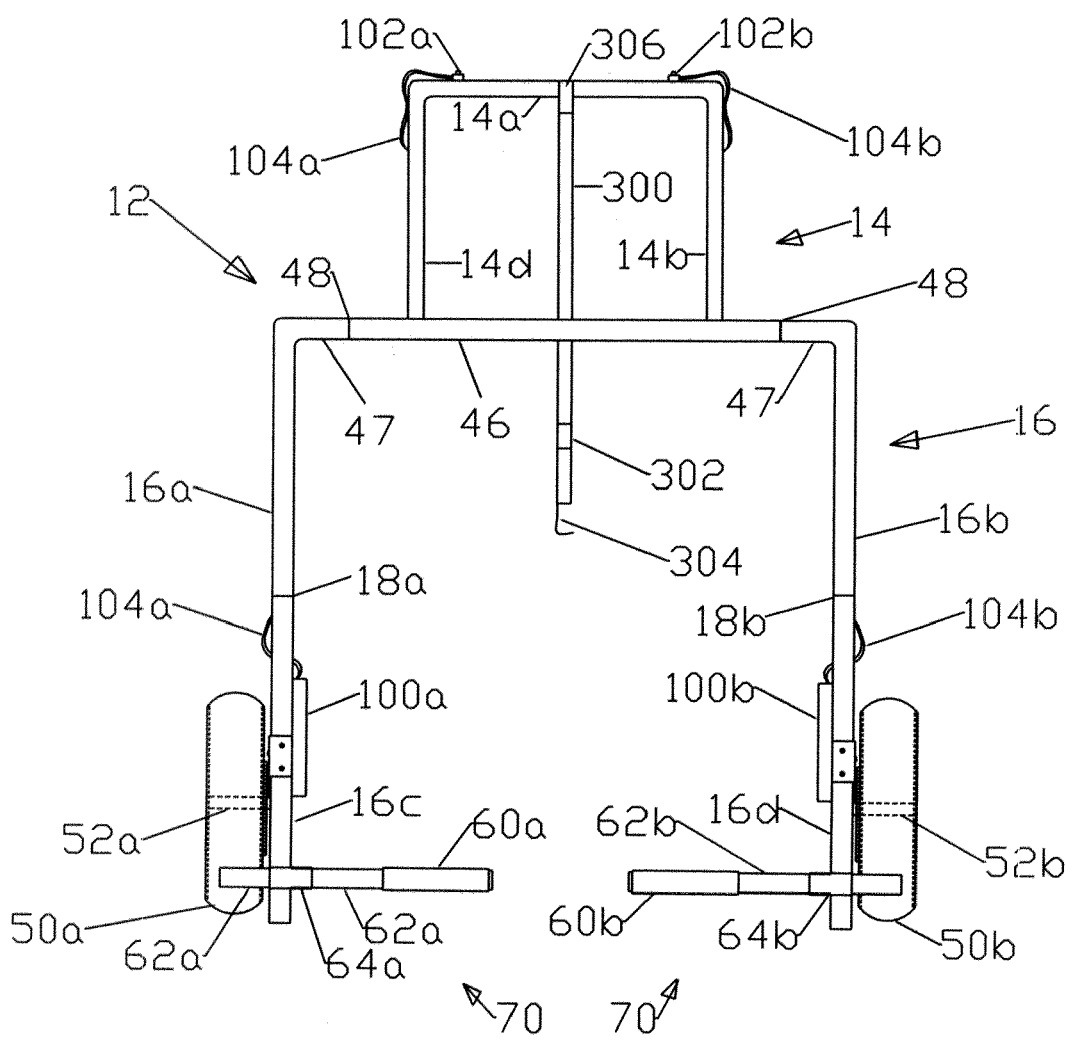
FIG. 1 illustrates an elevation front view of a motorized wheel-driven cart according to the principles of the present invention.

10 Motorized wheel-driven snowmobile cart.
12 Body frame of cart 10.
14 Handle portion of body frame 12.
14a Hand-holding arm of handle 14.
14b Handle arm.
14d Opposite handle arm.
16 Legs portions of body frame 12.
16a Upper leg portion of left side of cart, as viewed on page.
16b Upper leg portion of right side of cart, as viewed on page.
16c Lower leg portion of left side of cart.
16d Lower leg portion of right side of cart.
18 Connection means connecting upper and lower leg portions of leg 16.
18a Forward extending leg portion.
20 Snowmobile.
22 Ski of snowmobile 20.
26 Seat of snowmobile 20.
46 Handle portion of handle 14 connecting handle 14 to legs 16 of frame body 12.
47 Connection arm sections of legs 16 in cooperation with connection arms 48.
48 Connection arms connecting to 47.
50a One wheel of cart 10.
50b Another wheel of cart 10.
52a Wheel axel or shaft rotationally attached to wheel 50a.
52b Wheel axel or shaft rotationally attached to wheel 50b.
55 Spacer or stand off.
56 Collar over shaft.
58 Metal rim wheel hub.
60a Lift pad attached to lift rod 62a.
60b Lift pad attached to lift rod 62b.
62a Lift rod connecting lift pad 60a to lift rod receptor 64a.
62b Lift rod connecting lift pad 60a to lift rod receptor 64b.
64a Lift rod receptor for receiving lift rod 62a.
64b Lift rod receptor for receiving lift rod 62b.
66 Bearing.
70 Lift assemblies.
100 A gear motor.
100a One gear motor.
100b Another gear motor.
102a Thumb switch used to control motor 100a.
102b Thumb switch used to control motor 100b.
104a Wire connecting thumb switch 102a to motor 100a.
104b Wire connecting thumb switch 102b to motor 100b.
105 A gearbox.
120 Small sprocket.
122 Attachment means for attaching gear box 105 to motor mount 150.
140 Large sprocket.
142 Bolts connecting large sprocket 140a to wheel to provide for wheel rotation.
150 Motor mount.
152 Means for attaching motor mount "L" bracket 150 to leg part.
160 Roller drive chain or belt.
200 Track-driven snowmobile cart.
202 Track-drive belt.

206a A first track-drive (drive cog or gear).
206b A track idler roller.
208 Continuous track-drive belt.
210 Gear wheel.
210a Aperture in gear wheel.
212 Step-down shaft.
212a One step-down shaft part.
213 Step-down shaft part rotationally attached to gear wheel 210.
214a Large sprocket.
216 Triangularly shaped pivoting frame.
217a Aperture of pivoting collar 218a.
218a Pivoting collar.
220a Shaft for accepting and holding roller 206b.
220b Shaft for accepting and holding drive 206a.
224a Aperture.
224b Aperture.
300 Strap means.
302 Means to adjust strap means 300 length.
304 Hook at one end of strap means 300 to hook onto snowmobile frame.
306 Loop at opposite end of strap means 300 to fasten strap to handle.
410 Battery.

It should be understood that the drawings are not necessarily to scale. In certain instances, details which are not necessary for an understanding of the present invention or which render other details difficult to perceive may have been omitted.

DEFINITIONS

Caterpillar tracks, as used herein, are large (modular) tracks used on tanks, construction equipment, and certain other off-road vehicles. Unlike Kégresse tracks which use a flexible belt, most caterpillar tracks are made of a number of rigid units that are joined to each other. In general, tracks distribute a vehicle's weight over a larger surface area than wheels can, thus safeguarding the vehicle from sinking in areas where wheeled vehicles of the same weight would likely sink. For example, the ground pressure of a car is equal to the pressure of the air in the tires, perhaps 30 psi (207 kPa), whereas the seventy-tonne M1 Abrams tank has a ground pressure of just over 15 psi (103 kPa).

First class lever, as used herein, is a lever device in which the fulcrum is located between the input force and the output force, i.e. the lever's pivot point. In operation, a force is applied (by pulling or pushing) one section of the lever's bar, which causes the lever to swing about the fulcrum, overcoming the resistance force on the opposite side. Even though hand carts and trucks are L-shaped, they work on the same principle using the wheel as a fulcrum.

Gear motor, as used herein, refers to a motor used in conjunction with a set of speed-reducing gears. Gear motors are a class of motors equipped with either an integral gear box or gear reduction unit. Gear motors have an integrated gear train and the motor output is used to drive the gears. There are two major types of gear motors AC and DC gear motors. Other types of gear motors are: single, multiphase, servo, universal, induction and synchronous. AC gear motors run on alternating current. They have three windings in series for the stator, a rotor and an integral gearbox. A changing magnetic field makes the rotor rotate on the motor axis. DC gear motors come in two types, brushless and servo. They have a rotor, a stator with permanent magnets and a gearbox. The magnetic field is generated by permanent or electromagnets. They are used in applications with variable torque and speed. Gear motors are selected by: the speed of the shaft, continuous torque, current, output power and other specifications. Other specifications include the gear ratio, types of gears and the maximum torque transferred at the output shaft. The set of gears drive a secondary drive shaft. These motors are capable of increasing the torque generating capacity of the motor while simultaneously reducing its output speed. A major advantage that comes with the usage of gears of this type is that the driving shaft is coupled directly to the driven shaft. Furthermore, they eliminate the necessity for coupling the motor to a separate external speed reducer. These motors are common in hot melt glue pumps, conveyor drives, tape dispensers, labeling, box tapers, case erectors and heat shrink tunnels.

Kégresse track, as used herein, refers to a kind of caterpillar track which uses a flexible belt rather than interlocking metal segments. It can be fitted to a conventional car or truck to turn it into a half-track, suitable for use over rough or soft ground. Conventional front wheels and steering are used.

Handcart or hand truck, as used herein, is an L-shaped object designed for moving heavy objects. The handcart is generally equipped with a back support structure having handles at one end, wheels attached to the base, and a small carrying shelf protruding forward of the back support structure. When the hand-truck is upright, the carrying shelf (or lift) remains flat against the floor. To use the cart, the object to be moved is tilted forward, the carrying shelf is inserted beneath the object, so that the object is tilted back and resting on the ledge and, sometimes, also on the back support. Then the truck and object are tilted backward until the weight is balanced over the wheels, making otherwise bulky and heavy objects easier to move Hand-trucks are sometimes used as baggage carts by porters in train stations. A dolly is comparable to a hand truck. Hand trucks act as a first class lever.

Titanium is a much harder metal than aluminum and approaches the high hardness possessed by some of the heat-treated alloy steels. Iodide purity titanium has a hardness of 90 VHN (Vickers), unalloyed commercial titanium has a hardness of about 160 VHN and when alloyed and heat-treated, titanium can attain hardness in the range of 250 to 500 VHN. A typical commercial alloy of 130,000 psi yield strength might be expected to have a hardness of about 320 VHN or 34 Rockwell C.

Vickers hardness test, as used herein refers to the test that was developed in the early 1920s as an alternative method to measure the hardness of materials. The Vickers test is often easier to use than other hardness tests since the required calculations are independent of the size of the indenter, and the indenter can be used for all materials irrespective of hardness. The basic principle, as with all common measures of hardness, is to observe the questioned materials' ability to resist plastic deformation from a standard source. The Vickers test can be used for all metals and has one of the widest scales among hardness tests. The unit of hardness given by the test is known as the Vickers Pyramid Number (HV). The hardness number is determined by the load over the surface area of the indentation and not the area normal to the force, and is therefore not a pressure.

Some examples are: Stainless Steels 140-180HV30; Carbon Steel 55-120HV5; and Iron 30-80HV5.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein. Left and right are defined as the left and right of the person viewing the drawing.

The motorized handcart, of the present invention, is structurally designed for the easy lifting and easy moving of large, heavy, and awkward shaped objects over various types of terrain. The cart, as taught, provides the leverage required for easy lifting and motor-assisted movement of the object it is lifts, motorized steering aids, and optional drive systems. The track-driven cart provides for the use of the cart on rugged terrain and the wheel-driven cart provides for its use on smoother terrain, such as a garage floor. Although the cart is designed for and capable of moving numerous types of large, heavy objects, for ease and simplicity of description, the structure and use of the cart is described below in its capacity as a snowmobile lifting and transporting device.

As illustrated in FIG. 1, motorized, wheel-driven, snowmobile cart 10 of the present invention includes tubular body frame 12 comprising handle 14, leg system 16, and lifts 70. Handle 14 is constructed as a one piece unit comprising hand-holding section 14a, right handle arm 14b, spaced, opposing left-side handle arm 14d, and bottom arm portion 46 having pair of connection arm extensions 48 that extend toward legs 16 for connecting to cooperating connection means 47. The pair of leg connecting means 48, which in this example are legwardly extending extensions of handle arms 14b and 14d have male connection ends to be accepted by female accepting portions 47 of tubular-like legs 16 providing for secure attachment of the handle part to the leg part of the frame. There are many design choices for connecting handle 14 to a pair of receiving portions 47 of legs 16a and 16b. For example, if desired, handle 14 could be made in separate, connectable, pieces, for example where a single unit comprising 14a, 14b, and 14d is manufactured to be attached to portion 46 at the time of initial cart assembly. Another example would have handle portion 14a extended in length to span the space between legs 16a and 16b, so that handle arms 14b and 14d would extend directly down to meet and attach to legs 16a and 16b, respectively, without the need for handle extension portions 46 and 48. Moreover, the arm and leg portions of the body could be manufactured as one continuous piece. Having said that, providing for detachable and adjustable attachments provides the advantage of being able to adjust the width of the handle, as the legs may be set at desired distances from each other, thus, providing for cart 10 to lift and carry relatively narrow or relatively broad articles. Such width adjusting means are well-known in the art and need not be discussed further. All of the width adjusting means, either well-known or yet to be known, are contemplated for use with the present invention. Such design choices are all within the scope of the invention. As there are many ways to construct the handle portion of the motorized cart such differences in manufacture should not be considered to deter from the principles of the invention and all known and yet to be known methods of manufacture that provide for a workable handle are contemplated for use with the invention. There are also many methods of affixing the handle portion to the leg portion, such as by welding, pinching, or using a detachable attachment means such as pins, which could be set screws. Upper arm 14a of handle 14 serves as a holding means to be held by one or both hands of a user when an article, such as a snowmobile, is to be raised up off of its ground support for transport to another location.

As illustrated in FIG. 1, legs 16 comprise upper leg portions 16a and 16b and lower leg portions 16c and 16d. Upper leg portions 16a and 16b are connected to lower leg portions 16c and 16d, respectively, using a pair of connecting means 18. The choice of connections between upper leg portion 16a and lower leg portion 16c and the connection between upper leg portion 16b and lower leg portion 16d may be similar to the choice of connections between connection means 48 and cooperating portions 47, as discussed above. In the drawings, female/male connections are used to connect upper leg portion 16a to lower leg portion 16c and to connect upper leg portion 16b to lower leg portion 16d. There are many choices in the design of the leg portions, just as there are in the design of the handle portion. All of these choices are contemplated for use with the invention.

Figure 3A:
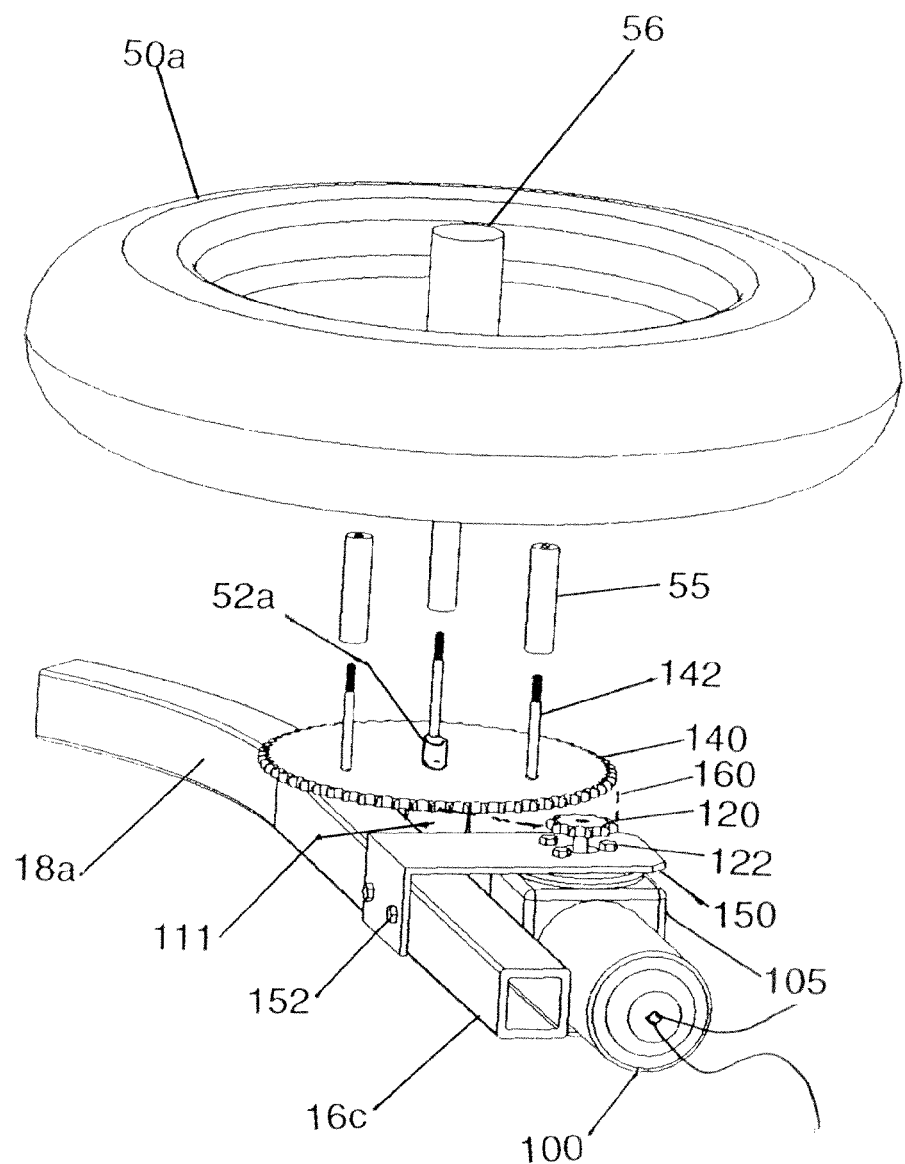
FIG. 3a illustrates a perspective close-up view of a motor assembly of the wheel-driven embodiment of the present invention and how it connects to a wheel of the cart.

As illustrated in FIGS. 2 and 3a, extending from lower leg 16c there is forwardly extending leg portion 18a (the mirror image structure extending from lower leg 16d is not shown). Forwardly extending leg portion 18a extends out from lower leg 16c at approximately about, but a little greater than a 90° degree angle relative to lower leg 16c to which it is connected so that when cart 10 is at rest, forwardly extending leg portions 18a, and its mirror image, are generally parallel to the surface on which cart 10 is resting. The angle between extending leg portion 18a and lower leg 16c depends on the size of the wheel used and, thus, will change as the size of the wheel changes.

Referring again to FIG. 1 along with FIG. 2, forwardly extending leg portion 18a of lower leg 16c is illustrated attached to and supporting lift 70. Lift 70 is firmly attached to forwardly extending leg portion 18a, such as by welding. Lift 70 comprises rod receptor 64a for receiving lift rod 62a. Similarly, firmly attached to leg extension portion 18b (not shown) of lower leg 16d is lift rod receptor 64b for receiving lift rod 62b. Adjustably attached to the end of lift rod 62a to extend into the space defined by the structure of frame 12 is lift pad 60a functionally positioned to directly engage the frame portion of a snowmobile, or other large, heavy object. Adjustably attached to the end of lift rod 62b and extending into the space defined by the structure of frame 12 is lift pad 60b functionally positioned to directly engage the frame portion of a snowmobile, or other large, heavy object. The position of lift pad 60a on lift rod 62a relative to lower leg 16c and the position of lift pad 60b on lift rod 62b relative to lower leg 16d may be adjusted, by any functional adjusting means, so that the lift pads are closer to or further away from their respective wheels to provide for the carts use in lifting and transporting relatively wide or relatively narrow objects. Such functional adjusting means are well known in the art and do not need to be discussed further here.

FIG. 2 illustrates how a large, bulky, and heavy snowmobile 12 is supported by cart 10 for the lifting and transporting of the snowmobile by the cart. Lift pads 60a and 60b, as illustrated in FIG. 1, engages and support the forward portion of the structural frame of snowmobile 20 while strap 300 engages the rearward portion of the frame of snowmobile 20. Once the frame of the snowmobile is resting on lift pads 60a and 60b and strap 300 is securely fastened to the rear frame portion of the snowmobile, a user simply pulls down on handle 14 which acts as a lever about the fulcrum of the wheels to raise snowmobile 20 off of the ground so that snowmobile skis 22 also are raised off of the ground. Once the snowmobile is raised up off of the ground surface, the motor is engaged to provide for easy moving of the snowmobile, or other large object. Cart 10 further includes a pair of rotating devices in the form of wheels 50a and 50b, and strap 300. As illustrated, strap 300 includes hook 304 for engaging the frame of the snowmobile. Strap 300 includes strap loop 306 for engaging handle crossbar portion 14a of handle 14 of cart 10.

One of the major advantages of the lift cart taught herein is its ability to provide the lifting leverage required for one person to lift and support an awkwardly shaped object many times his or her weight, such as a snowmobile. The cart is designed to act as a first-class lever to provide the mechanical advantage needed to lift and maneuver heavy weight objects. As can be understood by looking at FIG. 2, a side elevation view of cart 12 supporting snowmobile 20, the first end of the lever bar consists of the total length of handle 14 together with the length of legs 16, and the second end of the lever bar consists of the length of leg extension 18b. Wheels 50 act as the fulcrum. As defined, a first class lever device has its fulcrum (pivot point) located between the input force and the output force. In operation of a person lifting a snowmobile, for example, the input force is the action of a person pulling down on the handle (the first end of the lever's bar) to cause the lever to pivot about the wheel (the fulcrum), overcoming the resistance force (the weight of the snowmobile) on the opposite end. Even though hand carts and trucks are L-shaped, they work on the first class lever principle by using the wheel as a fulcrum. The length of right and left connecting arms 14b and 14d of handle 14 are set to provide for the distance required from the surface on which wheels 50 rest to the holding part of the handle for a person using the cart to lift a heavy article up from the ground. Once the front end of the object is supported by lifts 70 and strap 300 is attached to both the handle of the frame of the cart and to the frame of the object to be lifted, such as the snowmobile shown as an example in FIG. 2, handle 14 is able to serve as a lever to raise the load positioned on lifts 70 of the cart. Length adjustment means 302, here shown as a buckle, provides for strap 300 to be shortened or lengthened to suit the height of the user. Providing for detachable adjustable attachment allows for a choice in the length of legs 16 so that the distance of upper pulling handle 14a from the floor may be increased to increase the amount of leverage available for lifting a heavy object. There are many known constructions for providing adjustable attachments. For example, one part, such as upper leg portion 16a may be fitted inside the hollow tube that comprises lower leg portion 16c. Upper leg portion 16a is provided with a retractable extendable fitting or stub that is kept in a retracted position until the desired height of the leg is achieved by either pushing upper leg portion further into lower leg portion or by raising upper leg portion relative to lower leg portion. When the desired leg height is accomplished the extendable spring-like fitting is aligned with a receiving aperture in lower leg into which aperture the fitting extends to provide for a secure adjustable attachment.

Additional significant advantages of the present invention include the carts possessing a motor. The motor facilitates movement of the cart and it also provides for powered steering of the cart. FIG. 1 further illustrates motors 100a and 100b physically secured to legs 16 to provide power to wheels 50a and 50b. Motors 100a and 100b are separate and distinct from each other, and thus, work independent of one another. Motor 100a is controlled by thumb switch 102a and motor 100b is controlled by thumb switch 102b. Thumb switches 102a and 102b are connected to motors 100a and 100b, respectively, by wires 104a and 104b, respectively. Thumb switches 102a and 102b provide settings for on and off, as well as for forward and reverse motions, each at a desired speed. Motored control of the cart makes moving even a loaded cart easy compared to moving a loaded cart without motor power. The ability to control motors 100a and 100b individually is what provides for a user to easily steer the cart even when it is fully loaded with a heavy object, such as in this example, a snowmobile.

Figure 3B:
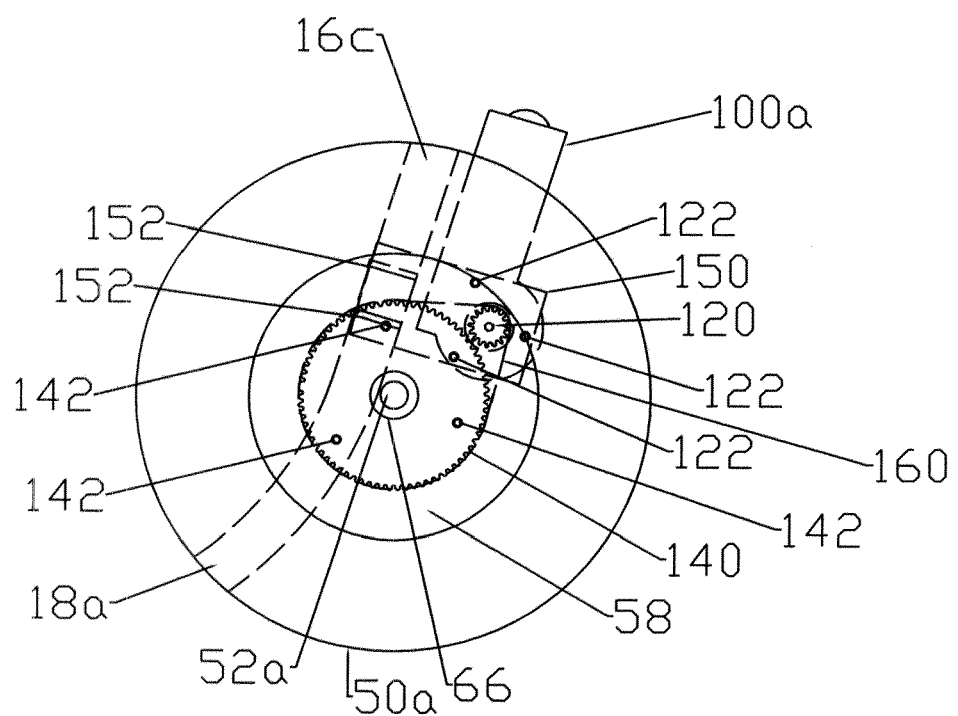

FIG. 3a, a perspective close-up view and FIG. 3b, a partially transparent side elevation view, illustrate the relationship of gear motor 100 to the frame of the cart and to its wheels. The right side gear/wheel assemblies are a mirror image of the left, thus, only the gear/wheel relationships and interactions on left side of the cart, i.e., defined as the side of the cart on which wheel 50a is attached, is hereby provided. Attachment means 152 provide for attachment of motor mount 150 to leg extension part 16c. Attachment means 122 fixedly attach gear box 105, positioned on the underside of motor mount 150, to motor mount 150. Small sprocket 120 is rotably attached to gear box 105 through motor mount 150. The motor drives small sprocket 120, which in turn, drives large sprocket 140 by means of roller chain or belt 160 (shown in dashed lines for clarity). Large sprocket 140 is rotably attached to lower leg 16c through attachment means 111. Bolts 142 extend up from large sprocket 140 to be received by stand-offs 55 that are fixedly attached to wheel hub 58. Wheel shaft (axle) 52a is received and held fixed to wheel 50a by coupler 56, just as axle 52b is received and held fixed to wheel 50b, as illustrated in FIG. 1. Bearing 66 provides for smooth wheel motion.

FIG. 4, a side elevation view, illustrates motorized track-driven cart 200. There are times when a large object, such as snowmobile 20, needs to be moved over rough terrain, as compared to the relatively smooth surface of a garage floor. This might happen if there is break-down of the motor, or the fuel supplies runs out, when the snowmobile is in the field. In these instances, it is likely that motorized wheel-driven carts may not have the traction required to move a heavy object, especially if the ground is soft, such as when it is moisture saturated or in various states of thaw. One way to overcome this problem is to provide for the motorized cart to be equipped with a track-drive assembly instead of wheel-drives. Tracks help to distribute the weight more evenly over a larger surface area than wheels can, keeping the weighted cart from sinking in areas where wheeled carts of the same weight would sink. Continuous tracks 208 of track-drive assembly 202 provide for both increased drive surface area and for those surfaces to have the required traction. As is well-known in the art, continuous track-drive belts are driven via drive idler rollers; the rollers, as illustrated, comprise first track-drive 206a, idler 206b and idler 206b. Gear motor 100 is controlled by means of a control circuit comprising thumb control switches 102a and 102b and connecting wires 104a and 104b that in this example are "stored" within the inner recesses of hollow, tubular handles 14, and powered by means of a battery pack 410, which is situated along frame 12 of the powered cart 200. There are other known ways of powering a motor, such as the gear motor used in this example. Gas, electric, or any other fossil fuel or solar energy source of energy could be used, for example. It is to be understood that any number of control configurations could be utilized in the motorized cart assembly 200 and still come within the scope of the present invention.

FIG. 5 is a front elevation view of one side section of a motorized wheel-driven cart frame and one side section of a motorized track-driven cart frame to illustrate the similarities and differences between a motorized wheel-driven cart and a motorized track-driven cart. As indicated by the drawing, each type of drive may use the same, or similar, frame handle and legs, and may employ the same style strap.

Figure 6C:
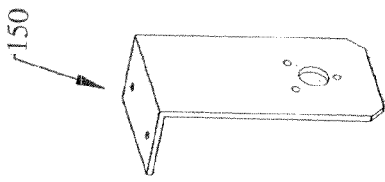
FIG. 6c illustrates a perspective close-up view of a motor mount that may be used with the track-driven embodiment of the present invention.
Figure 6B:
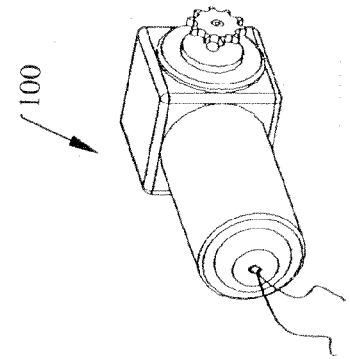
FIG. 6b illustrates a perspective close-up view of a motor that may be used with the track-driven embodiment of the present invention.
Figure 6A:
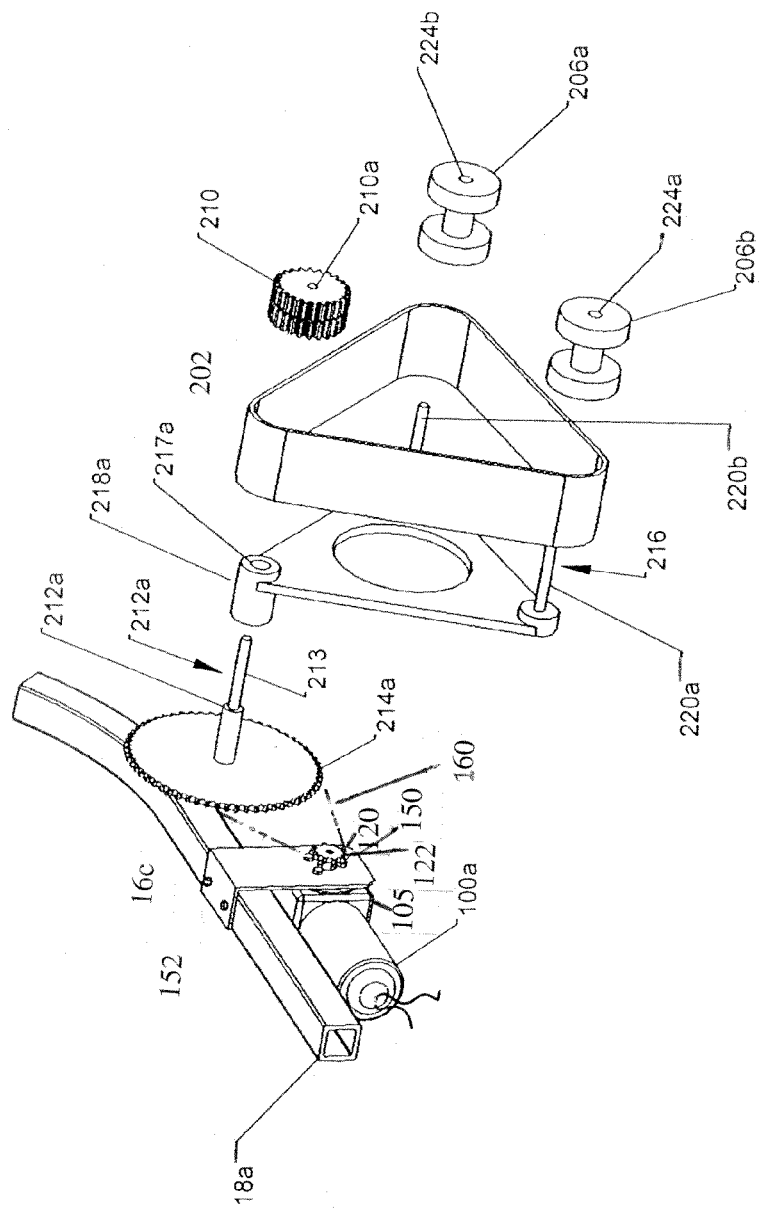
FIG. 6a illustrates a perspective close-up view of the motor of the track-driven version of the present invention and how it relates to a wheel of the cart.

FIG. 6a is a perspective close-up view of how the motor of the track-driven embodiment corresponds to a wheel of the cart. The right side gear/wheel assemblies are a mirror image of the left, thus, only the gear/wheel relationships and interactions on left side of the cart are hereby provided. As illustrated in FIG. 3a, an attachment means 152 provides for attachment of motor mount 150 to leg part 16c. Attachment means 122 fixedly attaches gear box 105, positioned on the underside of motor mount 150 to motor mount 150. Small sprocket 120 is rotably attached through motor mount 150 to gear box 105. Small sprocket 120 drives large sprocket 214a by means of roller chain or belt 160 (shown in dashed lines). Large sprocket 214a is rotably attached to lower leg 16c. Step-down shaft part 213 of shaft 212 extends up from step-down shaft part 212a that extends up from large sprocket 214a to which shaft part 212a is fixedly attached. Step-down shaft part 213 is accepted into and extends through aperture 217a of pivoting collar 218a to be received into aperture 210a of gear 210 to form a gear/step-down shaft assembly. Pivoting collar 218a is attached to one of three corners of triangularly shaped pivoting frame 216. Fixedly attached to the two remaining corners of frame 216 are shafts 220a and 220b for accepting and holding rollers 206b and 206a, respectively. The gear/step-down shaft assembly rotates in response to the drive of the gear motor. In turn, the gear/step-down shaft assembly drives the drive track belt 202 to move in a continuously rotating manner about the gear/step-down shaft assembly and idler rollers 206a and 206b that together define the three corners of pivoting frame 216.

FIG. 6b, a perspective close-up view, illustrates gear motor 100 that is used in conjunction with the present invention. FIG. 6c, a perspective close-up view, illustrates motor mount 150 that is used in conjunction with the present invention.

To use cart 10 (the wheel-driven embodiment) to lift and transport a snowmobile, for example, first the cart is maneuvered so that cart wheels 50a and 50b are positioned one on each side of snowmobile 20. Handle portion 14a is positioned at over seat 26 of the snowmobile providing for the front-end of the snowmobile to be received onto lifts 70 between leg ends 16c and 16d. Strap 300 is attached to handle 14 by strap loop means 306 and engaged to the snowmobile frame at the back end of the snowmobile 20 using hook means 304. Strap 300 is shortened using shortening means 302. Shortening strap 300 effectively draws the cart handle and the back end of the snowmobile toward each other. When strap 300 has been sufficiently tightened, handle 14 and legs 16 (acting as a lever about the fulcrum point of the wheels) may be lowered by the user toward the surface upon which the snowmobile is resting to lift the snowmobile up off of its resting surface so that the snowmobile may be transported to a desired location with the assistance of the motor driven wheels. Each control motor 100a and 100b can be engaged individually to allow a user to easily steer the cart even when it is fully loaded with a heavy object, such as in this example, a snowmobile.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims, thus the invention is limited only by the claims.

What is claimed is:

1. A hand cart, comprising:
    a dual-motor cart adapted for lifting, steering, and transporting a heavy object by a single person having:
        two rotatable devices for moving and steering said cart each functionally positioned about an opposing axle, and
        a first motor functionally attached to one of said two rotatable devices and a second motor functionally attached to the other of said rotatable devices adapted to individually or simultaneously provide power to one or both of said rotatable devices, respectively, to move one or both of said rotatable devices forward or reverse at a desired rate of speed and to provide the force required for a single person to move, lift, and steer said cart with the engaged heavy object.

2. The hand cart, as recited in claim 1, further comprising a frame having a handle, said frame being height adjustable providing for the distance of said handle from the floor to be increased or decreased to provide the amount of frame provided leverage required by persons of different heights to lift a heavy object.

3. The hand cart, as recited in claim 2, wherein said frame further comprises a leg extending from each opposing end of said handle wherein each of said legs comprises two pieces, wherein said two pieces are slidably engagable to each other providing for each of said legs to be length adjustable.

4. The hand cart, as recited in claim 1, further including a lift strap suspended from said handle, said strap for coupling with the heavy object to be lifted, wherein said strap is length adjustable providing for said strap to be shortened or lengthened to suit the height of the user.

5. The hand cart, as recited in claim 1, wherein said frame is width adjustable providing for said cart to lift and transport a relatively narrow or relatively broad heavy object.

6. The hand cart, as recited in claim 1, wherein said heavy object is a snowmobile.

7. The hand cart, as recited in claim 1, wherein a thumb switch is connected to each of said motors, said thumb switch having settings for on, off, forward, and reverse motions each at a desired speed providing for a single person to easily steer the cart even when it is loaded with a heavy object.

8. A hand cart, comprising:
    a dual-motor wheel driven cart adapted for lifting, steering, and transporting a heavy object by a single person having:
        two wheels for moving and steering said cart, each of said two wheels functionally positioned about an axle,
        a frame coupled to each of said two wheels, said frame comprising:
            a handle,
            one or more legs extending from said handle, and
            a lift pad affixed to each of said legs spaced
        such that the heavy object may be received between the legs and engaged by said lift pads,
        said handle and said legs cooperatively serving as a lever and said axles acting as fulcrums providing for lifting the heavy object engaged by said lift pads and
        a first motor functionally attached to one of said two wheels and a second motor functionally attached to the other of said wheels adapted to individually or simultaneously provide power to one or both of said wheels, respectively, to move one or both of said wheels forward or reverse at a desired rate of speed and to provide the force required for a single person to move, lift, and steer said cart with the engaged heavy object.

9. The hand cart, as recited in claim 8, wherein said frame is height adjustable providing for the distance of said handle from the floor to be increased or decreased to provide the amount of leverage required by persons of different heights to lift a heavy object.

10. The hand cart, as recited in claim 8, further including a lift strap suspended from said handle, said strap for coupling with the heavy object to be lifted, wherein said strap is length adjustable providing for said strap to be shortened or lengthened to suit the height of the user.

11. The hand cart, as recited in claim 8, wherein said frame is width adjustable providing for said cart to lift and transport a relatively narrow or relatively broad heavy object.

12. The hand cart, as recited in claim 8, wherein said heavy object is a snowmobile.

13. The hand cart, as recited in claim 8, wherein a thumb switch is connected to each of said motors, said thumb switch having settings for on, off, forward, and reverse motions each at a desired speed providing for a single person to easily steer the cart even when it is loaded with a heavy object.

14. A hand cart, comprising:
   a dual-motor track-driven cart adapted for lifting, steering, and transporting a heavy object by a single person having:
      two track drives for moving and steering said cart, each of said two track drives functionally positioned about an axle,
      a frame coupled to each of said two track drives, said frame comprising:
         a handle,
         a leg extending from an opposing end of said handle, and
         a lift pad affixed to each of said legs spaced
      such that the heavy object may be received between the legs and engaged by said lift pads,
   said handle and said legs cooperatively serving as a lever and said axles acting as fulcrums providing for lifting the heavy object engaged by said lift
   a first motor functionally attached to one of said two track drives and a second motor functionally attached to the other of said track drives, said motors separately or simultaneously providing to each of said track drives ability to move forward or in reverse at a desired rate of speed and the force required for a single person to move, lift, and steer said cart with the engage heavy object.

15. The hand cart, as recited in claim 14, wherein said frame is height adjustable providing for the distance of said handle from the floor to be increased or decreased to provide the amount of leverage required by persons of different heights to lift a heavy object.

16. The hand cart, as recited in claim 14, wherein each of said legs comprises two pieces, wherein said two pieces are slidably engagable to each other providing for each of said legs to be length adjustable.

17. The hand cart, as recited in claim 14, further including a lift strap suspended from said handle, said strap for coupling with the heavy object to be lifted, wherein said strap is length adjustable providing for said strap to be shortened or lengthened to suit the height of the user.

18. The hand cart, as recited in claim 14, wherein said frame is width adjustable providing for said cart to lift and transport a relatively narrow or relatively broad heavy object.

19. The hand cart, as recited in claim 14, wherein said heavy object is a snowmobile.

20. The hand cart, as recited in claim 14, wherein a thumb switch is connected to each of said motors, said thumb switch having settings for on, off, forward, and reverse motions each at a desired speed providing for a single person to easily steer the cart even when it is loaded with a heavy object.

* * * * *